US012795346B2

(12) United States Patent
Zhao et al.

(10) Patent No.: US 12,795,346 B2
(45) Date of Patent: Nov. 10, 2026

(54) TECHNIQUES FOR AN OPTIMIZED DUAL SUBSCRIBER IDENTITY MODULE DUAL ACTIVE MODE

(71) Applicant: QUALCOMM Incorporated, San Diego, CA (US)

(72) Inventors: Can Zhao, San Diego, CA (US); Suli Zhao, San Diego, CA (US); Qingxin Chen, San Diego, CA (US); Cheol Hee Park, San Diego, CA (US); Xinchen Zhang, San Diego, CA (US); Mutaz Zuhier Afif Shukair, San Diego, CA (US); Uttam Pattanayak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 17/650,434

(22) Filed: Feb. 9, 2022

(65) Prior Publication Data

US 2022/0286839 A1 Sep. 8, 2022

Related U.S. Application Data

(60) Provisional application No. 63/156,223, filed on Mar. 3, 2021.

(51) Int. Cl.
*H04W 8/18* (2009.01)
*H04L 1/00* (2006.01)
(Continued)

(52) U.S. Cl.
CPC ........... *H04W 8/183* (2013.01); *H04L 1/0025* (2013.01); *H04W 76/16* (2018.02); *H04W 88/06* (2013.01)

(58) Field of Classification Search
None
See application file for complete search history.

(56) References Cited

U.S. PATENT DOCUMENTS 8,934,460 B1 * 1/2015 Hu ........................ H04W 76/15 370/252
9,648,635 B2 5/2017 Lee et al.
(Continued)

OTHER PUBLICATIONS

International Search Report and Written Opinion—PCT/US2022/070614—ISA/EPO—May 11, 2022.

*Primary Examiner* — Gregory B Sefcheck
(74) *Attorney, Agent, or Firm* — Harrity & Harrity LLP/QUALCOMM Incorporated

(57) ABSTRACT

Various aspects of the present disclosure generally relate to wireless communication. In some aspects, a user equipment (UE) may configure a first channel associated with a first subscriber identity module (SIM), the first SIM associated with data traffic. The UE may configure a second channel associated with a second SIM in a dual SIM dual active (DSDA) mode. The UE may detect, on the second channel, a subscription related data stream that includes voice call traffic. The UE may determine, based on detecting the subscription related data stream, to switch the data traffic from the first SIM to the second SIM based at least in part on a UE operation mode. The UE may switch the data traffic from the first SIM to the second SIM based at least in part on the determination to switch the data traffic. Numerous other aspects are described.

30 Claims, 6 Drawing Sheets

(51) Int. Cl.
*H04W 76/16* (2018.01)
*H04W 88/06* (2009.01)

(56) References Cited

U.S. PATENT DOCUMENTS

| | | | | |
|---|---|---|---|---|
| 9,661,674 | B2 * | 5/2017 | Su | H04W 8/183 |
| 10,524,177 | B2 | 12/2019 | Miao et al. | |
| 10,687,298 | B2 | 6/2020 | Miao et al. | |
| 11,917,478 | B2 * | 2/2024 | Bongaarts | H04W 36/32 |
| 2014/0256283 | A1 * | 9/2014 | Lin | H04W 4/025 455/404.2 |
| 2014/0274006 | A1 * | 9/2014 | Mutya | H04W 4/16 455/416 |
| 2014/0362824 | A1 * | 12/2014 | Rousu | H04L 5/001 370/331 |
| 2015/0094071 | A1 | 4/2015 | Hang et al. | |
| 2015/0249945 | A1 * | 9/2015 | Katamreddy | H04W 36/14 455/436 |
| 2015/0282057 | A1 * | 10/2015 | Li | H04B 7/0871 455/552.1 |
| 2016/0142998 | A1 * | 5/2016 | Tsai | H04W 48/20 455/458 |
| 2016/0183192 | A1 * | 6/2016 | Kang | H04M 1/72463 370/311 |
| 2017/0094628 | A1 * | 3/2017 | Miao | H04W 36/08 |
| 2017/0127217 | A1 * | 5/2017 | Miao | H04W 76/15 |
| 2017/0318523 | A1 * | 11/2017 | Lindoff | H04W 48/20 |
| 2018/0041953 | A1 * | 2/2018 | Lindoff | H04W 24/08 |
| 2018/0084597 | A1 * | 3/2018 | Kanagarathinam | H04W 76/15 |
| 2018/0160362 | A1 * | 6/2018 | Raghunathan | H04W 84/045 |
| 2019/0166475 | A1 * | 5/2019 | Nankandiyil | H04W 48/18 |
| 2019/0230566 | A1 * | 7/2019 | Schneider | H04W 40/12 |
| 2020/0374979 | A1 * | 11/2020 | Rice | H04B 1/3816 |
| 2021/0022073 | A1 * | 1/2021 | Kwok | H04W 76/16 |
| 2021/0112554 | A1 * | 4/2021 | Li | H04W 72/0453 |
| 2021/0345219 | A1 * | 11/2021 | Watts, Jr. | H04W 4/70 |
| 2021/0368327 | A1 | 11/2021 | Gao | |
| 2022/0038979 | A1 * | 2/2022 | Bongaarts | H04W 8/183 |
| 2022/0053607 | A1 * | 2/2022 | Rice | H04W 72/569 |
| 2022/0110015 | A1 * | 4/2022 | Krishnamurthy | H04W 76/30 |
| 2022/0248206 | A1 * | 8/2022 | Gopal | H04W 8/18 |
| 2022/0248274 | A1 * | 8/2022 | Singh | H04W 36/0022 |
| 2022/0312289 | A1 * | 9/2022 | Horita | H04W 36/30 |
| 2022/0322289 | A1 * | 10/2022 | Xu | H04L 1/18 |
| 2022/0338293 | A1 * | 10/2022 | Yu | H04L 27/2605 |
| 2023/0042849 | A1 * | 2/2023 | Sabouri-Sichani | H04W 72/1263 |
| 2023/0047213 | A1 * | 2/2023 | Chen | H04W 68/02 |
| 2023/0276266 | A1 * | 8/2023 | Yang | H04W 24/02 370/252 |
| 2023/0308905 | A1 * | 9/2023 | Teyeb | H04L 5/0035 |
| 2024/0406782 | A1 * | 12/2024 | Krishnamurthy | H04W 72/54 |

* cited by examiner

300

TECHNIQUES FOR AN OPTIMIZED DUAL SUBSCRIBER IDENTITY MODULE DUAL ACTIVE MODE

CROSS-REFERENCE TO RELATED APPLICATION

This Patent Application claims priority to U.S. Provisional Patent Application No. 63/156,223, filed on Mar. 3, 2021, entitled "TECHNIQUES FOR AN OPTIMIZED DUAL SUBSCRIBER IDENTITY MODULE DUAL ACTIVE MODE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for an optimized dual subscriber identity module, dual active (DSDA) mode.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes configuring a first channel associated with a first subscriber identity module (SIM), the first SIM associated with data traffic; configuring a second channel associated with a second SIM in a dual SIM dual active (DSDA) mode; detecting, on the second channel, a subscription related data stream, wherein the subscription related data stream includes voice call traffic; determining, based at least in part on detecting the subscription related data stream, to switch the data traffic from the first SIM to the second SIM based at least in part on a UE operation mode; and switching the data traffic from the first SIM to the second SIM based at least in part on the determination to switch the data traffic from the first SIM to the second SIM.

In some aspects, a UE for wireless communication includes a memory and one or more processors, coupled to the memory, configured to: configure a first channel associated with a first SIM, the first SIM associated with data traffic; configure a second channel associated with a second SIM in a DSDA mode; detect, on the second channel, a subscription related data stream, wherein the subscription related data stream includes voice call traffic; determine, based at least in part on detecting the subscription related data stream, to switch the data traffic from the first SIM to the second SIM based at least in part on a UE operation mode; and switch the data traffic from the first SIM to the second SIM based at least in part on the determination to switch the data traffic from the first SIM to the second SIM.

In some aspects, a non-transitory computer-readable medium storing a set of instructions for wireless communication includes one or more instructions that, when executed by one or more processors of a UE, cause the UE to: configure a first channel associated with a first SIM, the first SIM associated with data traffic; configure a second channel associated with a second SIM in a DSDA mode; detect, on the second channel, a subscription related data stream, wherein the subscription related data stream includes voice call traffic; determine, based at least in part on detecting the subscription related data stream, to switch the data traffic from the first SIM to the second SIM based at least in part on a UE operation mode; and switch the data traffic from the first SIM to the second SIM based at least in part on the determination to switch the data traffic from the first SIM to the second SIM.

In some aspects, an apparatus for wireless communication includes means for configuring a first channel associated with a first SIM, the first SIM associated with data traffic; means for configuring a second channel associated with a second SIM in a DSDA mode; means for detecting, on the second channel, a subscription related data stream, wherein the subscription related data stream includes voice call traffic; means for determining, based at least in part on detecting the subscription related data stream, to switch the data traffic from the first SIM to the second SIM based at least in part on an operation mode of the apparatus; and means for switching the data traffic from the first SIM to the second SIM based at least in part on the determination to switch the data traffic from the first SIM to the second SIM.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
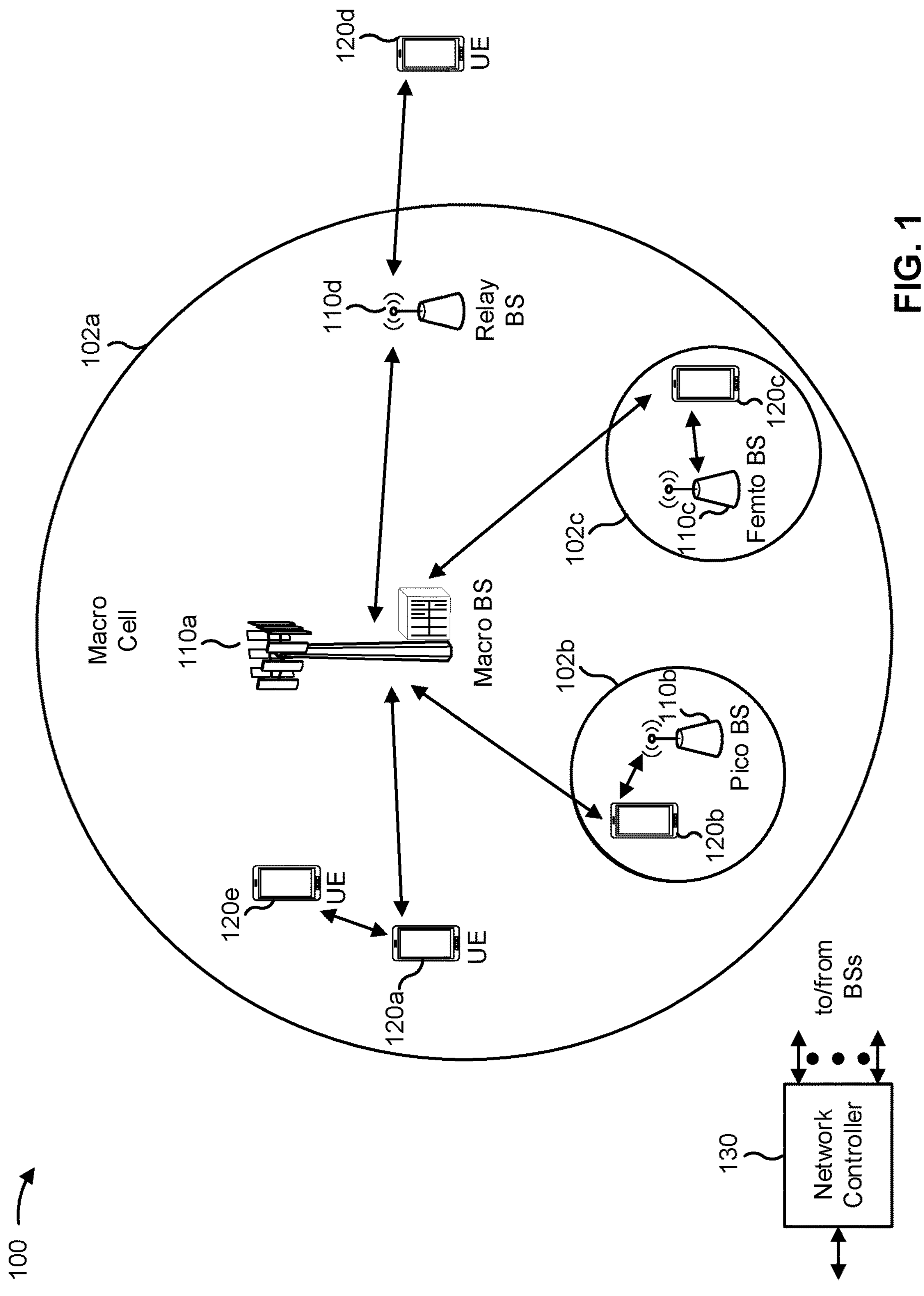
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band.

Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
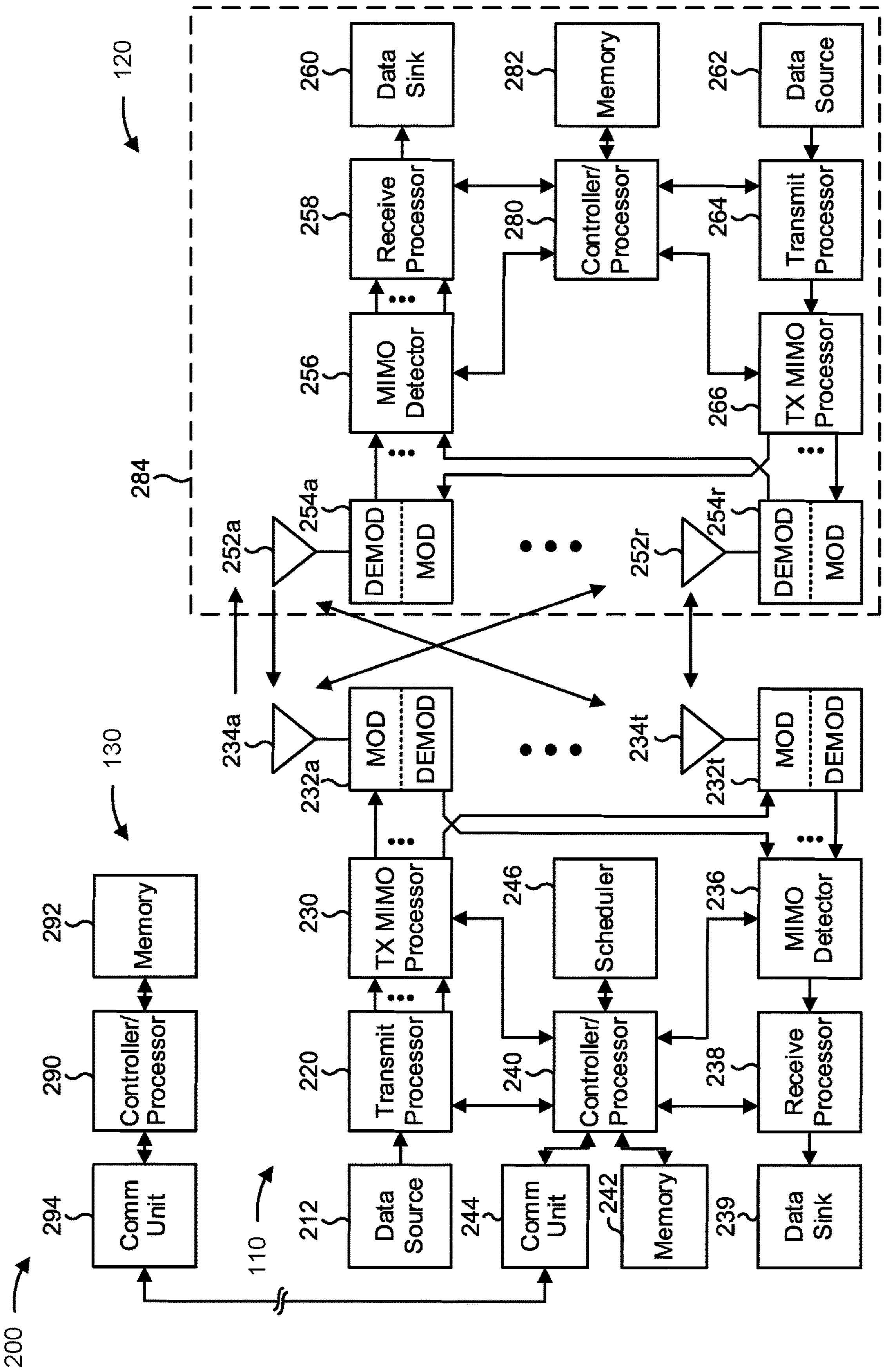
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with an optimized dual subscriber identity module (SIM), dual active (DSDA) mode, as described in more detail elsewhere herein. For example, controller/processor 240 of base station 110, controller/processor 280 of UE 120, and/or any other component(s) of FIG. 2 may perform or direct operations of, for example, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, and/or other processes as described herein. In some aspects, executing instructions may include running the instructions, converting the instructions, compiling the instructions, and/or interpreting the instructions.

In some aspects, the UE 120 includes means for configuring a first channel associated with a first SIM, the first SIM associated with data traffic; means for configuring a second channel associated with a second SIM in a DSDA mode; means for detecting, on the second channel, a subscription related data stream, wherein the subscription related data stream includes voice call traffic; means for determining, based at least in part on detecting the subscription related data stream, to switch the data traffic from the first SIM to the second SIM based at least in part on a UE operation mode; and/or means for switching the data traffic from the first SIM to the second SIM based at least in part on the determination to switch the data traffic from the first SIM to the second SIM. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for performing a temporary default data subscription (DDS) switch from the first SIM to the second SIM.

In some aspects, the UE 120 includes means for switching the data traffic from the first SIM to the second SIM for a duration of the subscription related data stream.

In some aspects, the UE 120 includes means for detecting that at least one of the first SIM or the second SIM has transitioned to a radio access technology or a frequency band that does not support the DSDA mode.

In some aspects, the UE 120 includes means for detecting a condition that prevents the UE from operating in the DSDA mode; and/or means for determining to switch the data traffic from the first SIM to the second SIM based at least in part on the detection of the condition that prevents the UE from operating in the DSDA mode.

In some aspects, the UE 120 includes means for comparing the first channel condition and the second channel condition; and/or means for determining to switch the data traffic from the first SIM to the second SIM based at least in part on the comparison of the first channel condition and the second channel condition.

In some aspects, the UE 120 includes means for determining that at least one of: a first throughput of the second channel is greater than a second throughput of the first channel by a throughput threshold, a first delay of the second channel is less than a second delay of the first channel by a delay threshold, or a first radio frequency (RF) condition of the second channel is greater than a second RF condition of the first channel by an RF threshold.

In some aspects, the UE 120 includes means for identifying an application associated with the data traffic; means for determining that the application is associated with the second SIM; and/or means for determining to switch the data traffic from the first SIM to the second SIM based at least in part on the determination that the application is associated with the second SIM.

In some aspects, the UE 120 includes means for determining to switch the data traffic from the first SIM to the second SIM based at least in part on a capability of at least one of the UE, a first network associated with the first SIM, or a second network associated with the second SIM.

In some aspects, the UE 120 includes means for identifying a configuration that indicates that the UE is enabled to switch data traffic from the first SIM to the second SIM.

As indicated above, FIG. 2 is provided as an example. Other examples may differ from what is described with regard to FIG. 2.

Figure 3:
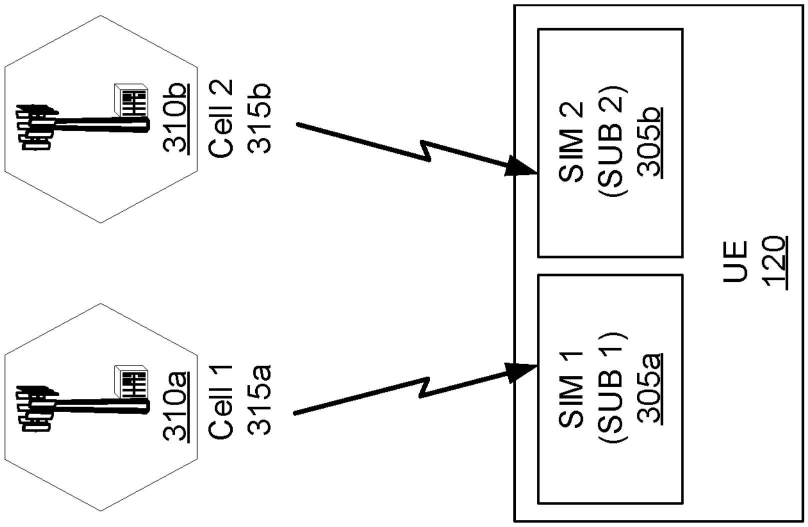
FIG. 3 is a diagram illustrating an example of a multi-subscriber identity module (SIM) UE, in accordance with the present disclosure.

FIG. 3 is a diagram illustrating an example 300 of a multiple SIM (multi-SIM) UE, in accordance with the present disclosure. As shown in FIG. 3, a UE 120 may be a multi-SIM UE that includes multiple SIMs (two or more SIMs), shown as a first SIM 305*a* and a second SIM 305*b*. The first SIM 305*a* may be associated with a first subscription (shown as SUB 1), and the second SIM 305*b* may be associated with a second subscription (shown as SUB 2). A subscription may be a subscription with a network operator (for example, a mobile network operator (MNO)) that enables the UE 120 to access a wireless network (for example, a radio access network (RAN)) associated with the network operator.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service or a voice service, among other examples.

As further shown in FIG. 3, the UE 120 may communicate (for example, in a connected mode, an idle mode, or an inactive mode) with a first base station 310*a* via a first cell 315*a* (shown as Cell 1) using the first SIM 305*a*. In this case, a first subscription (SUB 1) of the UE 120 may be used to access the first cell 315*a* (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310*b* via a second cell 315*b* (shown as Cell 2) using the second SIM 305*b*. In this case, a second subscription (SUB 2) of the UE 120 may be used to access the second cell 315*b* (for example, using a second IMSI for UE identification, using a second security key for UE authentication, using a second list of services that the UE 120 is permitted to access using the second subscription, or by counting data or voice usage on the second cell against the second subscription, among other examples).

The first base station 310*a* and/or the second base station 310*b* may include one or more of the base stations 110 described above in connection with FIG. 1. Although the first cell 315*a* and the second cell 315*b* are shown as being provided by different base stations, in some aspects, the first cell 315 and the second cell 315*b* may be provided by the same base station. Thus, in some aspects, the first base station 310*a* and the second base station 310*b* may be integrated into a single base station.

In some cases, the UE 120 may be capable of operating in a multi-SIM multiple standby (MSMS) mode, such as a dual SIM dual standby (DSDS) mode (e.g., when the UE 120 is associated with two subscriptions). Additionally, or alternatively, the UE 120 may be capable of operating in a multi-SIM multiple active (SR-MSMA) mode, such as a DSDA mode (e.g., when the UE 120 is associated with two subscriptions).

In a DSDA mode, the UE 120 is capable of concurrent active communication using both SIMS of the UE 120. Thus, a UE 120 in the DSDA mode is capable of communicating using the first SIM 305*a* (and the first subscription) at the same time as communicating using the second SIM 305*b* (and the second subscription). For example, when the UE 120 is in an active session (e.g., a voice call or another latency sensitive service, such as online gaming, stock trading, or an over-the-top (OTT) service) using the first SIM 305*a*, the UE 120 is capable of receiving a notification of a voice call using the second SIM 305*b* without interrupting communications that use the first SIM 305*a*, and without tuning or switching away from the first cell 315*a* to tune to the second cell 315*b*.

In a DSDS mode, the UE 120 is not capable of concurrent active communication using both SIMS of the UE 120. Thus, a UE 120 in the DSDS mode is not capable of communicating using the first SIM 305*a* (and the first subscription) at the same time as communicating using the second SIM 305*b* (and the second subscription). However, a UE 120 in the DSDS mode may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, a UE 120 in the DSDS mode may be capable of receiving data on only one connection at a time because radio frequency resources are shared between the multiple subscriptions. For example, a UE 120 in the DSDS mode may be associated with multiple subscriptions but may include only a single transceiver shared by the multiple subscriptions, a single transmit chain shared by the multiple subscriptions, or a single receive chain shared by the multiple subscriptions, among other examples (e.g., a transmit chain sharing state).

In some examples, a UE 120 may be capable of operating in a DSDA mode for a first combination of RATs, and may not be capable of operating in a DSDA mode for a second combination of RATs. For example, the UE 120 may be capable of operating in a DSDA mode for NR+NR, where the first cell 315*a* (as well as the first SIM 305*a* and the first subscription) uses an NR RAT and the second cell 315*b* (as well as the second SIM 305*b* and the second subscription) also uses the NR RAT. However, the UE 120 may not be capable of operating in a DSDA mode for NR+LTE, where one of the first cell 315*a* (as well as the first SIM 305*a* and the first subscription) uses an NR RAT and the second cell 315*b* (as well as the second SIM 305*b* and the second subscription) uses an LTE RAT (or vice versa). In some aspects, the UE 120 may not be capable of operating in the DSDA mode for the second combination of RATs (e.g., NR+LTE), but be capable of operating in a DSDS mode for the second combination of RATs. This UE design reduces design costs as compared to enabling the UE 120 to operate using the DSDA mode for the second combination of RATs.

In some cases, a multi-SIM UE may include a first SIM that is associated with data traffic (e.g., a DDS or a dedicated data subscription) and a second SIM that is not associated with data traffic (e.g., a non-DDS SIM). If the multi-SIM UE receives a subscription-related data stream, such as a voice call, on the non-DDS SIM, then the multi-SIM UE may be required to temporarily (e.g., for the duration of the subscription-related data stream) switch data traffic (e.g., internet traffic) from the first SIM (e.g., the DDS SIM) to the second SIM (e.g., the non-DDS SIM) to avoid an interruption in the data traffic caused by the second SIM occupying radio resources of the multi-SIM UE for the subscription-related data stream. However, switching data traffic from the first SIM (e.g., the DDS SIM) to the second SIM (e.g., the non-DDS SIM) may cause a traffic flow interruption because the default interface for the data traffic is changed (e.g., from the first SIM to the second SIM). Additionally, in some cases, traffic on the first SIM may be subscription related or subscription specific traffic that cannot be communicated using the second SIM. Further, in some cases, the second SIM may be associated with a lower data rate and/or a lower throughput than a data rate and/or a throughput of the first SIM (e.g., the second SIM may be operating using a RAT associated with a lower data rate and/or a lower throughput than the RAT associated with the first SIM).

If the multi-SIM UE is operating in the DSDA mode, a temporary switch in data traffic from the first SIM to the second SIM (e.g., due to a voice call on the second SIM) may not be necessary as the multi-SIM UE may be capable of maintaining an active session on both SIMS, as described above. Therefore, in some cases, a temporary switch in data traffic from the first SIM to the second SIM (e.g., due to a voice call on the second SIM) may not be necessary. Additionally, in some cases, the first SIM (e.g., the DDS SIM) may be associated with poor channel conditions as compared to the second SIM (e.g., the non-DDS SIM). Therefore, in some cases, maintaining the data traffic on the first SIM may result in poor communication performance (e.g., lower throughput, lower data rates, higher latency, and/or higher delays) for the data traffic.

Some techniques and apparatuses described herein enable an optimized DSDA mode. For example, the multi-SIM UE may be enabled to determine when to switch data traffic from the first SIM (e.g., from the DDS SIM) to the second SIM (e.g., to the non-DDS SIM). For example, the multi-SIM UE may determine whether to switch the data traffic from the first SIM to the second SIM rather than automatically switching the data traffic when a subscription related data stream, such as a voice call, arrives on the second SIM.

The multi-SIM UE may be operating in the DSDA mode and may detect a subscription related data stream, such as a voice call, on the second SIM (e.g., the non-DDS SIM). In some aspects, the multi-SIM UE may determine whether to switch the data traffic from the first SIM to the second SIM based at least in part on a UE operation mode, such as whether the multi-SIM UE can operate in the DSDA mode and/or a transmit chain sharing state of the UE. For example, the multi-SIM UE (e.g., on the first SIM and/or the second SIM) may transition to a RAT combination and/or a frequency band combination that does not support the DSDA mode or full transmit concurrency (e.g., a DDS switch between SIMs may be needed if full transmit concurrency is not supported by the UE). Therefore, the multi-SIM UE may switch the data traffic from the first SIM to the second SIM based at least in part on detecting that the DSDA mode can no longer be supported. In some aspects, the multi-SIM UE may determine whether to switch the data traffic from the first SIM to the second SIM based at least in part on a first channel condition of the first SIM and a second channel condition of the second SIM. For example, if the multi-SIM UE determines that the second SIM (e.g., the non-DDS SIM) is associated with a better channel condition (e.g., a higher throughput, a higher data rate, a lower delay, a lower latency, and/or a higher RF condition), then the multi-SIM UE may switch the data traffic from the first SIM to the second SIM (e.g., while operating in the DSDA mode).

The transmit chain sharing state of the UE may include a transmit sharing state and/or a full transmit concurrency state. The transmit sharing state and the full transmit concurrency state may be states or modes under the DSDA mode. In the transmit sharing state, the first SIM and the second SIM may share one or more front end hardware components (e.g., may share a transmit chain) and only one SIM, from the first SIM and the second SIM, may be associated with transmission operations at a given time. In the full transmit concurrency state, the first SIM and the second SIM may share one or more front end hardware components (e.g., may share a transmit chain) and both SIMs may be associated with transmission operations at a given time.

As a result, the multi-SIM UE may be enabled to determine when to switch data traffic from the first SIM (e.g., from the DDS SIM) to the second SIM (e.g., to the non-DDS SIM). Therefore, the multi-SIM UE may avoid unnecessary switches in data traffic, thereby eliminating a traffic flow interruption of the data traffic that is caused by switching the default interface for the data traffic (e.g., from the first SIM to the second SIM). Moreover, the multi-SIM UE may be enabled to switch data traffic from the first SIM (e.g., from the DDS SIM) to the second SIM (e.g., to the non-DDS SIM) to improve communication performance while operating in the DSDA mode.

As indicated above, FIG. 3 is provided as an example. Other examples may differ from what is described with regard to FIG. 3.

Figure 4:
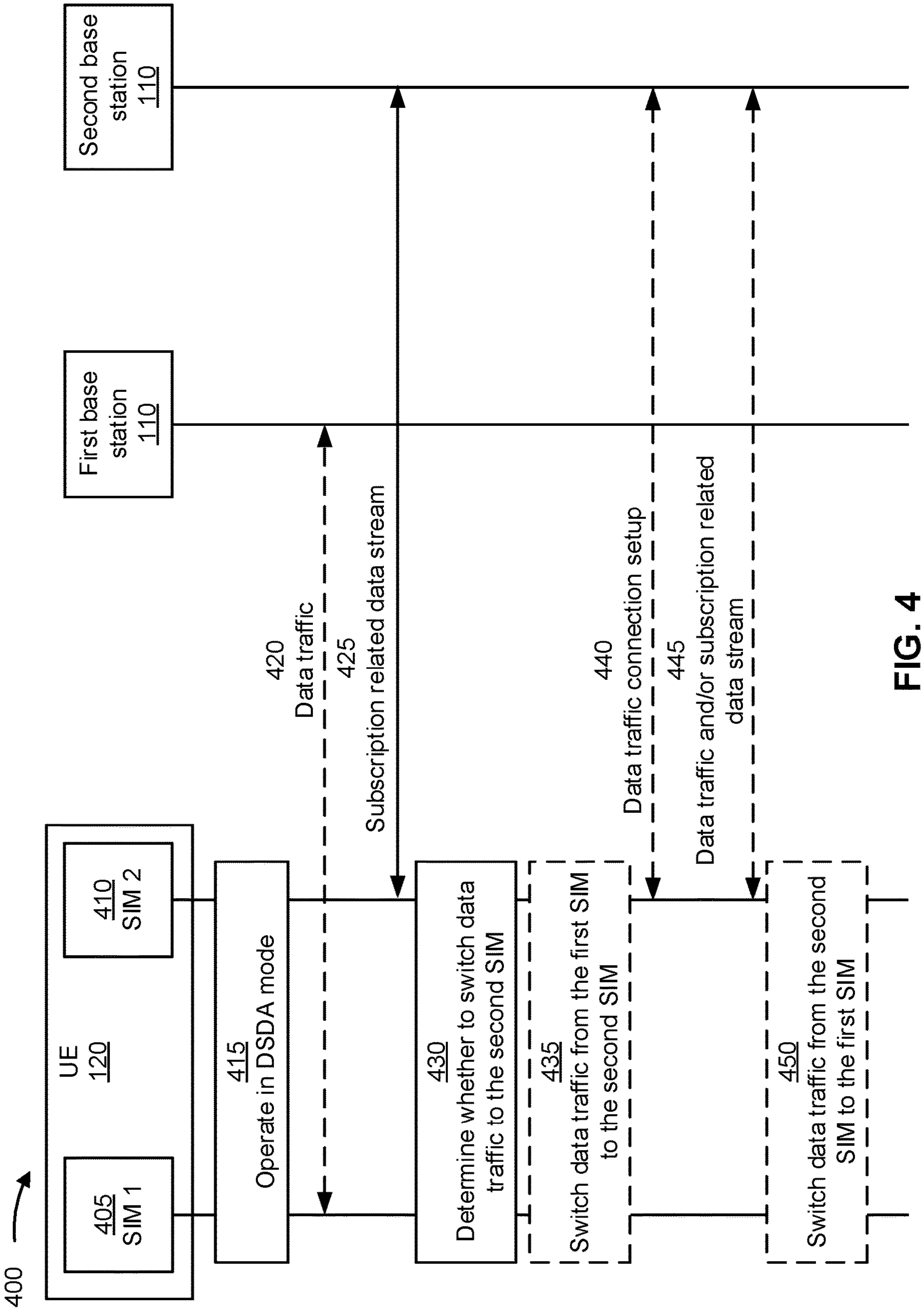
FIG. 4 is a diagram illustrating an example associated with an optimized dual SIM dual active (DSDA) mode, in accordance with the present disclosure.

FIG. 4 is a diagram illustrating an example 400 associated with an optimized DSDA mode, in accordance with the present disclosure. As shown in FIG. 4, a UE 120 may be a multi-SIM UE in a similar manner as described above in connection with FIG. 3. For example, the UE 120 may include a first SIM 405 (e.g., SIM 1) and a second SIM 410 (e.g., SIM 2). The first SIM 405 may be associated with a first subscription and the second SIM 410 may be associated with a second subscription (e.g., in a similar manner as described above in connection with FIG. 3). As described above, a subscription may be a subscription with a network operator (e.g., an MNO) that enables the UE 120 to access a wireless network, such as wireless network 100, associated with the network operator. For example, the UE 120 may access a wireless network associated with a first network operator (e.g., associated with the first SIM 405) via a first base station 110 (e.g., that is associated with the first network operator). Similarly, the UE 120 may access a wireless network associated with a second network operator (e.g., associated with the second SIM 410) via a second base station 110 (e.g., that is associated with the second network operator).

As depicted in FIG. 4, a dashed line or a dashed box may indicate an optional step or action. For example, in some aspects, steps or actions depicted using a dashed line may be performed by the UE 120. Alternatively, in some aspects, one or more (or all) steps or actions depicted using a dashed line may not be performed by the UE 120.

As shown by reference number 415, the UE 120 may operate in a DSDA mode. As described above, in the DSDA mode the UE 120 may be capable of concurrent active communication using both SIMs of the UE 120. Therefore, the UE 120 in the DSDA mode is capable of communicating using the first SIM 405 (and the first subscription) at the same time as communicating using the second SIM 410 (and the second subscription). For example, each SIM may store an IMSI number and keys associated with providing identification and authentication of the UE 120. In the DSDA mode, the UE 120 may be permitted to communicate using both SIMs simultaneously on two different carriers (e.g., a first carrier associated with the first base station 110 and a second carrier associated with the second base station 110). The two carriers may be associated with the same RAT or different RATs.

In some aspects, one SIM of the UE 120 may be a default or dedicated SIM (or subscription), such as a DDS, for data traffic (e.g., for internet traffic). Therefore, the UE 120 may communicate (e.g., transmit and/or receive) data traffic using the default or dedicated SIM. The UE 120 may use the other SIM (e.g., a non-DDS SIM) for communicating other traffic, such as voice calls, subscription related traffic, short message service (SMS) message traffic, and/or multimedia message service (MMS) message traffic, among other examples. As described above, "DDS SIM" may refer to a SIM that is the default or dedicated SIM for data traffic (e.g., for internet traffic). For example, the first SIM 405 may be the default or dedicated SIM (or subscription) for data traffic. Therefore, the first SIM 405 may be a DDS SIM and the second SIM 410 may be a non-DDS SIM.

The UE 120 may configure a first channel associated with the first SIM 405. For example, the UE 120 may configure the first channel between the UE 120 (e.g., and the first SIM 405) and the first base station 110. As described above, the first channel may be a default channel for data traffic associated with the UE 120. The UE 120 may configure a second channel associated with the second SIM 410. For example, the UE 120 may configure the second channel between the UE 120 (e.g., and the second SIM 410) and the second base station 110. As described, above, the second channel may not be a default channel for data traffic associated with the UE 120. For example, the UE 120 may use the second channel for other traffic, such as subscription specific traffic of the second SIM 410 and/or voice call traffic, among other examples.

For example, as shown by reference number 420, the UE 120 may communicate (e.g., transmit and/or receive) data traffic with the first base station 110 (e.g., using the first channel). The UE 120 may establish a data connection (e.g., an internet connection) with the first base station 110 (e.g., using the first channel) via an interface associated with the first SIM 405. For example, the UE 120 may configure a default interface for data traffic to be the interface associated with the first SIM 405. Therefore, the UE 120 may communicate data traffic using the first SIM 405 (e.g., by transmitting and/or receiving data traffic with the first base station 110 using the first channel). In some aspects, the DDS SIM may be identified or detected by the UE 120 via a configuration of the UE 120 (e.g., an original equipment manufacturer (OEM) configuration) and/or via a user input, among other examples.

As shown by reference number 425, the UE 120 may initiate a subscription related data stream between the second SIM 410 and the second base station 110. "Subscription related data stream" may refer to continuous traffic of the UE 120 that is associated with, or specific to, a subscription of a SIM. For example, a subscription related data stream may include a voice call and/or a video call (e.g., a video telephone call), among other examples. The UE 120 may transmit to, or may receive from, the second base station 110 (e.g., using the second channel) the subscription related data stream via an interface associated with the second SIM 410. For example, the UE 120 may detect that the subscription related data stream has been initiated via the non-DDS SIM (e.g., the second SIM 410) of the UE 120 while operating in the DSDA mode (e.g., on the second channel).

As shown by reference number 430, the UE 120 may determine whether to switch data traffic from the first SIM 405 to the second SIM 410 based at least in part on detecting that the subscription related data stream has been initiated via the second SIM 410. In some aspects, the UE 120 may determine whether to switch data traffic from the first SIM 405 to the second SIM 410 based at least in part on detecting that the subscription related data stream has been initiated while operating in the DSDA mode. For example, if the UE 120 detects that the subscription related data stream has been initiated (e.g., via the second SIM 410) while operating in another mode (e.g., a DSDS mode), then the UE 120 may (e.g., automatically) switch data traffic from the first SIM 405 to the second SIM 410 to avoid an interruption or a stoppage of the data traffic.

In some aspects, the UE 120 may determine whether to switch data traffic from the first SIM 405 to the second SIM 410 based at least in part on a UE operation mode. As used herein, "UE operation mode" may indicate whether the UE 120 can support the DSDA mode and/or a transmit chain sharing state (e.g., indicating whether transmit chains are shared among multiple SIMs). For example, the UE 120 may determine whether to switch data traffic from the first SIM 405 to the second SIM 410 based at least in part on identifying a configuration of the UE 120 that enables the UE 120 to determine when to switch data traffic. For example, a configuration setting of the UE 120 may enable or disable an option for the UE 120 to determine when to switch data traffic from a DDS SIM to a non-DDS SIM. If the configuration setting indicates that the option is disabled, then the UE 120 may switch data traffic (e.g., automatically) from a DDS SIM to a non-DDS SIM when the subscription related data stream begins on the non-DDS SIM. If the configuration setting indicates that the option is enabled, then the UE 120 may determine whether (or when) to switch data traffic from a DDS SIM to a non-DDS SIM while the subscription related data stream is ongoing on the non-DDS SIM, as described in more detail herein. In some aspects, the configuration setting may indicate that the UE 120 is not to not switch data traffic from a DDS SIM to a non-DDS SIM when the subscription related data stream begins on the non-DDS SIM. For example, the UE 120 may refrain from switching data traffic from a DDS SIM to a non-DDS SIM when the subscription related data stream begins on the non-DDS SIM based at least in part on the configuration setting in some cases. In some aspects, the configuration setting may be configured by an OEM configuration and/or via a user input, among other examples.

In some aspects, as shown by reference number 435, the UE 120 may determine to switch data traffic from the first SIM 405 to the second SIM 410. As used herein, "switch data traffic from the first SIM 405 to the second SIM 410" may refer to the UE 120 performing a switch (e.g., a temporary switch) for a default interface of the UE 120 for data traffic (e.g., for internet traffic). For example, the UE 120 may perform a temporary DDS switch from the first SIM 405 to the second SIM 410, such that the second SIM 410 may serve as the DDS SIM while the subscription related data stream is ongoing on the second SIM 410. In other words, the UE 120 may switch (e.g., temporarily) a default channel for data traffic from the first channel (e.g., associated with the first SIM 405) to the second channel (e.g., associated with the second SIM 410). For example, switching data traffic from the first SIM 405 to the second SIM 410 may include switching or transitioning data traffic (e.g., ongoing data traffic) from the first channel (e.g., between the first SIM 405 and the first base station 110) to the second channel (e.g., between the second SIM 410 and the second base station 110).

In some aspects, the UE 120 may determine to switch data traffic from the first SIM 405 to the second SIM 410 based at least in part on determining or detecting that the UE 120 is no longer capable of operating in the DSDA mode. For example, the UE 120 may detect a condition (e.g., a channel condition, an operating condition of the UE 120, and/or a network condition) that prevents the UE 120 from operating in the DSDA mode. In some aspects, the UE 120 may detect that the UE 120 has transitioned from the DSDA mode to another operating mode, such as a DSDS mode. The UE 120 may determine to switch data traffic from the first SIM 405 to the second SIM 410 based at least in part on detecting that the UE 120 is no longer capable of operating in the DSDA mode and/or detecting that the UE 120 has transitioned from the DSDA mode to another operating mode, such as the DSDS mode.

In some aspects, the UE 120 may determine to switch data traffic from the first SIM 405 to the second SIM 410 based at least in part on determining or detecting that at least one of the first SIM 405 or the second SIM 410 has transitioned to a RAT or a frequency band that does not support the DSDA mode. For example, as described above, the UE 120 may be capable of operating in the DSDA mode for a first combination of RATs, and may not be capable of operating in the DSDA mode for a second combination of RATs. For example, the UE 120 may be capable of operating in a DSDA mode for NR+NR, where the first base station 110 (e.g., and the first SIM 405) uses an NR RAT and the second base station 110 (e.g., and the second SIM 410) also uses the NR RAT. However, the UE 120 may not be capable of operating in a DSDA mode for NR+LTE, where the first base station 110 (e.g., and the first SIM 405) uses an NR RAT and the second base station 110 (e.g., and the second SIM 410) uses an LTE RAT (e.g., or where first base station 110 (e.g., and the first SIM 405) uses an LTE RAT and the second base station 110 (e.g., and the second SIM 410) uses an NR RAT).

Similarly, the UE 120 may be capable of operating in the DSDA mode for a first combination of frequency bands, and may not be capable of operating in a DSDA mode for a second combination of frequency bands.

Therefore, the UE 120 may determine to switch data traffic from the first SIM 405 to the second SIM 410 based at least in part on determining or detecting that the UE 120 has transitioned to a RAT combination and/or a frequency band combination in which the UE 120 is not capable of operating in the DSDA mode. In some aspects, the UE 120 may identify a RAT combination and/or a frequency band combination in which the UE 120 is (and/or is not) capable of operating in the DSDA mode based at least in part on a capability of the UE 120 and/or a capability of the network (e.g., a capability of the network associated with the first base station 110 and/or a capability of the network associated with the second base station 110), among other examples.

In some aspects, the UE 120 may determine to switch data traffic from the first SIM 405 to the second SIM 410 based at least in part on determining that a service associated with the second SIM 410 is better than a service associated with the first SIM 405. For example, the UE 120 may determine to switch data traffic from the first SIM 405 to the second SIM 410 based at least in part on channel conditions associated with the first SIM 405 and/or the second SIM 410. A channel condition may include a channel throughput condition, a channel delay condition, a channel latency condition, and/or an RF condition, among other examples. An RF condition may include an RSRP condition, an RSRQ condition, an RSSI condition, a signal-to-noise ratio (SNR) condition, a signal-to-interference-plus-noise ratio (SINR) condition, and/or one or more cell selection criteria conditions (e.g., one or more S criteria, such as a cell selection receive (Rx) level (Srxlev) condition, which may be a function of RSRP), among other examples.

In some aspects, the UE 120 may compare the first channel condition (e.g., of the first SIM 405 and/or the first channel) and the second channel condition (e.g., of the second SIM 410 and/or the second channel) to determine whether to switch data traffic from the first SIM 405 to the second SIM 410. For example, the UE 120 may determine to switch the data traffic from the first SIM 405 to the second SIM 410 based at least in part on the comparison of the first channel condition and the second channel condition. In some aspects, the UE 120 may determine to switch the data traffic from the first SIM 405 to the second SIM 410 based at least in part on determining that a first throughput of the second SIM 410 (e.g., and/or of the second channel) is greater than a second throughput of the first SIM 405 (e.g., and/or of the first channel) by a throughput threshold. In some aspects, the UE 120 may determine to switch the data traffic from the first SIM 405 to the second SIM 410 based at least in part on determining that a first channel delay of the second SIM 410 (e.g., and/or of the second channel) is less than a second channel delay of the first SIM 405 (e.g., and/or of the first channel) by a delay threshold. In some aspects, the UE 120 may determine to switch the data traffic from the first SIM 405 to the second SIM 410 based at least in part on determining that a first RF condition of the second SIM 410 (e.g., and/or of the second channel) is greater than a second RF condition of the first SIM 405 (e.g., and/or of the first channel) by an RF threshold. As a result, the UE 120 may be enabled to determine when the second SIM 410 (e.g., the second channel) may provide better service for the data traffic and may switch the data traffic from the first SIM 405 to the second SIM 410 (e.g., while the subscription related traffic is ongoing on the second SIM 410 and/or while the UE 120 is operating in the DSDA mode) in response.

In some aspects, the UE 120 may determine to switch data traffic from the first SIM 405 to the second SIM 410 based at least in part on an application executing on the UE 120. The UE 120 may identify one or more applications associated with data traffic on the first SIM 405. In some cases, an application may be associated with a subscription of the second SIM 410. For example, an entity associated with the application may have an agreement with the operator associated with the subscription related to charging fees and/or data rates, among other examples. Therefore, the UE 120 may determine that data traffic associated with the application should use the second SIM 410 (e.g., rather than the first SIM 405, which is the DDS SIM). The UE 120 may determine to switch the data traffic from the first SIM 405 to the second SIM 410 based at least in part on the determination that the application is associated with the second SIM 410.

In some aspects, the UE 120 may determine to not switch data traffic from the first SIM 405 to the second SIM 410 based at least in part on one or more of the considerations described above. For example, the UE 120 may determine that the UE 120 is capable of, and/or is still, operating in the DSDA mode, that a service provided by the first SIM 405 is better than (or equal to) a service provided by the second SIM 410 (e.g., based at least in part on the channel conditions as described above), and/or that an application executing on the UE 120 is not specifically associated with the second SIM 410, among other examples. For example, the UE 120 may determine that the first throughput of the second SIM 410 is not greater than the second throughput of the first SIM 405 by the throughput threshold, that the first channel delay of the second SIM 410 is not less than the second channel delay of the first SIM 405 by the delay threshold, and/or that the first RF condition of the second SIM 410 is not greater than the second RF condition of the first SIM 405 by the RF threshold, among other examples. If the UE 120 determines to not switch data traffic from the first SIM 405 to the second SIM 410, then the UE 120 may maintain data traffic (e.g., internet traffic) on the first SIM 405 during the duration of the subscription related data stream on the second SIM 410 (e.g., to avoid an interruption of the data traffic associated with switching the data traffic from the first SIM 405 to the second SIM 410).

In some aspects, the UE 120 may switch data traffic (e.g., automatically) from the first SIM 405 to the second SIM 410 based at least in part on determining to switch data traffic from the first SIM 405 to the second SIM 410, as described above. In some aspects, the UE 120 may recommend, to a high-level operating system (HLOS) executing on the UE 120, that the UE 120 should switch data traffic from the first SIM 405 to the second SIM 410 based at least in part on determining to switch data traffic from the first SIM 405 to the second SIM 410, as described above. The HLOS may trigger switching data traffic from the first SIM 405 to the second SIM 410 based at least in part on the recommendation. For example, the HLOS may transmit, to the second SIM 410, an internet connection setup request to cause the second SIM 410 to establish a data connection (e.g., an internet connection) with a network (e.g., with the second base station 110), as described below.

As shown by reference number 440, the UE 120 may establish a data traffic connection (e.g., an internet traffic connection) between the second SIM 410 and the second base station 110 based at least in part on determining to switch data traffic from the first SIM 405 to the second SIM 410, as described above. For example, the UE 120 may establish a data traffic connection (e.g., an internet traffic connection) between the second SIM 410 and the second base station 110 for an Internet Protocol (IP) layer of the UE 120. In some aspects, the UE 120 may switch a dedicated or a default interface for data traffic from the interface associated with the first SIM 405 to the interface associated with the second SIM 410 (e.g., based at least in part on establishing the data traffic connection).

As shown by reference number 445, the UE 120 may communicate (e.g., transmit and/or receive), with the second base station 110, data traffic and/or the subscription related data stream based at least in part on switching data traffic from the first SIM 405 to the second SIM 410, as described above. For example, while operating in the DSDA mode (or a DSDS mode), the UE 120 may use the second SIM 410 to communicate (e.g., transmit and/or receive) data traffic (e.g., internet traffic) and the subscription related data stream (e.g., a voice call) to improve a communication performance (e.g., increase throughput, increase data rates, and/or decrease latency) of the UE 120. Therefore, in some cases, although the UE 120 is capable of maintaining an active session on the first SIM 405 and the second SIM 410 (e.g., in the DSDA mode), the UE 120 may switch data traffic from the first SIM 405 to the second SIM 410 (e.g., while a subscription related data stream is ongoing on the second SIM 410) to improve a communication performance of the UE 120.

In some aspects, as shown by reference number 450, the UE 120 may switch data traffic from the second SIM 410 to the first SIM 405. For example, the UE 120 may switch data traffic from the second SIM 410 to the first SIM 405 based at least in part on detecting that the subscription related data stream on the second SIM 410 has ended or terminated. In some aspects, the UE 120 may switch data traffic from the second SIM 410 to the first SIM 405 based at least in part on determining that the first SIM 405 may provide better service for the data traffic (e.g., based at least in part on one or more channel conditions and/or applications executing on the UE 120) in a similar manner as described above.

As a result, the UE 120 may be enabled to dynamically switch data traffic between the first SIM 405 and the second SIM 410 while operating in the DSDA mode (e.g., and/or while a subscription related data stream is ongoing on the second SIM 410) to improve a communication performance of the UE 120. The UE 120 may be enabled to determine when to switch data traffic from the first SIM 405 (e.g., from the DDS SIM) to the second SIM 410 (e.g., to the non-DDS SIM). Therefore, the UE 120 may avoid unnecessary switches in data traffic, thereby eliminating a traffic flow interruption of the data traffic that is caused by switching the default interface for the data traffic (e.g., from the first SIM 405 to the second SIM 410). Moreover, the UE 120 may be enabled to switch data traffic from the first SIM 405 (e.g., from the DDS SIM) to the second SIM 410 (e.g., to the non-DDS SIM) to improve communication performance of the UE 120 while operating in the DSDA mode.

As indicated above, FIG. 4 is provided as an example. Other examples may differ from what is described with regard to FIG. 4.

Figure 5:
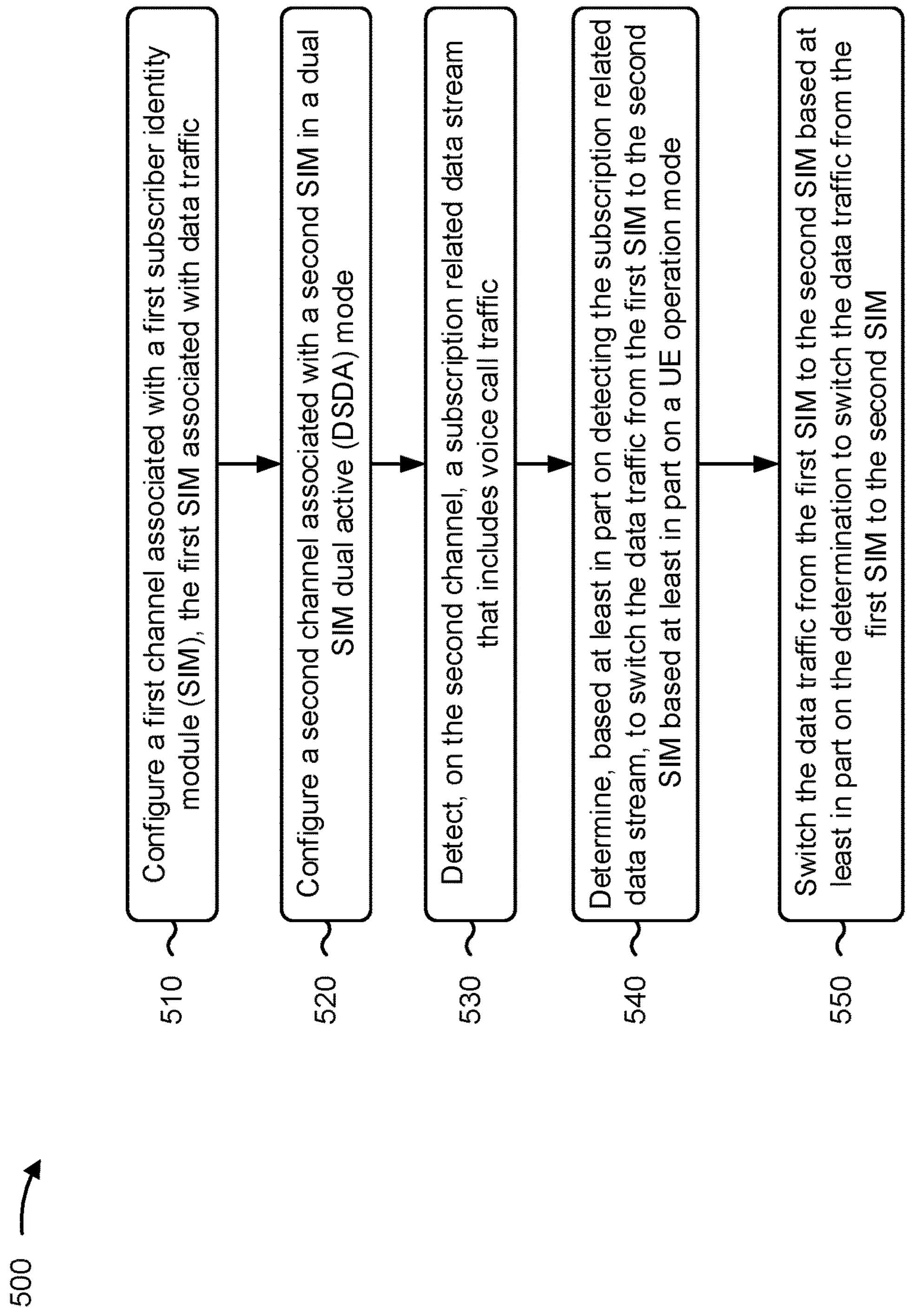
FIG. 5 is a diagram illustrating an example process associated with an optimized DSDA mode, in accordance with the present disclosure.

FIG. 5 is a diagram illustrating an example process 500 performed, for example, by a UE, in accordance with the present disclosure. Example process 500 is an example where the UE (e.g., UE 120) performs operations associated with an optimized DSDA mode.

As shown in FIG. 5, in some aspects, process 500 may include configuring a first channel associated with a first SIM, the first SIM associated with data traffic (block 510). For example, the UE (e.g., using channel configuration component 608, depicted in FIG. 6) may configure a first channel associated with a first SIM, the first SIM associated with data traffic, as described above.

As further shown in FIG. 5, in some aspects, process 500 may include configuring a second channel associated with a second SIM in a DSDA mode (block 520). For example, the UE (e.g., channel configuration component 608, depicted in FIG. 6) may configure a second channel associated with a second SIM in a DSDA mode, as described above.

As further shown in FIG. 5, in some aspects, process 500 may include detecting, on the second channel, a subscription related data stream that includes voice call traffic (block 530). For example, the UE (e.g., using detection component 610, depicted in FIG. 6) may detect, on the second channel, a subscription related data stream that includes voice call traffic, as described above.

As further shown in FIG. 5, in some aspects, process 500 may include determining, based at least in part on detecting the subscription related data stream, to switch the data traffic from the first SIM to the second SIM based at least in part on a UE operation mode (block 540). For example, the UE (e.g., using determination component 612, depicted in FIG. 6) may determine, based at least in part on detecting the subscription related data stream, to switch the data traffic from the first SIM to the second SIM based at least in part on a UE operation mode, as described above.

As further shown in FIG. 5, in some aspects, process 500 may include switching the data traffic from the first SIM to the second SIM based at least in part on the determination to switch the data traffic from the first SIM to the second SIM (block 550). For example, the UE (e.g., using channel configuration component 608, depicted in FIG. 6) may switch the data traffic from the first SIM to the second SIM based at least in part on the determination to switch the data traffic from the first SIM to the second SIM, as described above.

Process 500 may include additional aspects, such as any single aspect or any combination of aspects described below and/or in connection with one or more other processes described elsewhere herein.

In a first aspect, switching the data traffic from the first SIM to the second SIM includes performing a temporary DDS switch from the first SIM to the second SIM.

In a second aspect, alone or in combination with the first aspect, switching the data traffic from the first SIM to the second SIM includes switching the data traffic from the first SIM to the second SIM for a duration of the subscription related data stream.

In a third aspect, alone or in combination with one or more of the first and second aspects, determining to switch the data traffic from the first SIM to the second SIM includes detecting that the UE operation mode indicates that the DSDA mode is not supported based at least in part on at least one of the first SIM or the second SIM transitioning to a radio access technology or a frequency band that does not support the DSDA mode.

In a fourth aspect, alone or in combination with one or more of the first through third aspects, determining to switch the data traffic from the first SIM to the second SIM includes detecting that the UE operation mode indicates that the DSDA mode is not supported based at least in part on detecting a condition that prevents the UE from operating in the DSDA mode, and determining to switch the data traffic from the first SIM to the second SIM based at least in part on the detection of the condition that prevents the UE from operating in the DSDA mode.

In a fifth aspect, alone or in combination with one or more of the first through fourth aspects, determining to switch the data traffic from the first SIM to the second SIM includes comparing the first channel condition and the second channel condition, and determining to switch the data traffic from the first SIM to the second SIM based at least in part on the comparison of the first channel condition and the second channel condition.

In a sixth aspect, alone or in combination with one or more of the first through fifth aspects, determining to switch the data traffic from the first SIM to the second SIM includes determining that at least one of a first throughput of the second channel is greater than a second throughput of the first channel by a throughput threshold, a first delay of the second channel is less than a second delay of the first channel by a delay threshold, or a first RF condition of the second channel is greater than a second RF condition of the first channel by an RF threshold.

In a seventh aspect, alone or in combination with one or more of the first through sixth aspects, determining to switch the data traffic from the first SIM to the second SIM includes identifying an application associated with the data traffic, determining that the application is associated with the second SIM, and determining to switch the data traffic from the first SIM to the second SIM based at least in part on the determination that the application is associated with the second SIM.

In an eighth aspect, alone or in combination with one or more of the first through seventh aspects, determining to switch the data traffic from the first SIM to the second SIM includes determining to switch the data traffic from the first SIM to the second SIM based at least in part on a capability of at least one of the UE, a first network associated with the first SIM, or a second network associated with the second SIM.

In a ninth aspect, alone or in combination with one or more of the first through eighth aspects, determining to switch the data traffic from the first SIM to the second SIM is based at least in part on at least one of a channel throughput condition, a channel delay condition, a channel latency condition, or an RF condition.

In a tenth aspect, alone or in combination with one or more of the first through ninth aspects, the RF condition includes at least one of an RSRP condition, an RSRQ condition, an RSSI condition, an SNR condition, an SINR condition, or a cell selection criteria condition.

In an eleventh aspect, alone or in combination with one or more of the first through tenth aspects, process 500 includes identifying a configuration that indicates that the UE is enabled to switch data traffic from the first SIM to the second SIM.

In a twelfth aspect, alone or in combination with one or more of the first through eleventh aspects, the subscription related data stream includes at least one of voice call traffic, or video call traffic.

In a thirteenth aspect, alone or in combination with one or more of the first through twelfth aspects, the data traffic includes internet traffic.

In a fourteenth aspect, alone or in combination with one or more of the first through thirteenth aspects, the UE operation mode indicates at least one of: whether the DSDA mode can be supported by the UE; or a transmit chain sharing state of the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
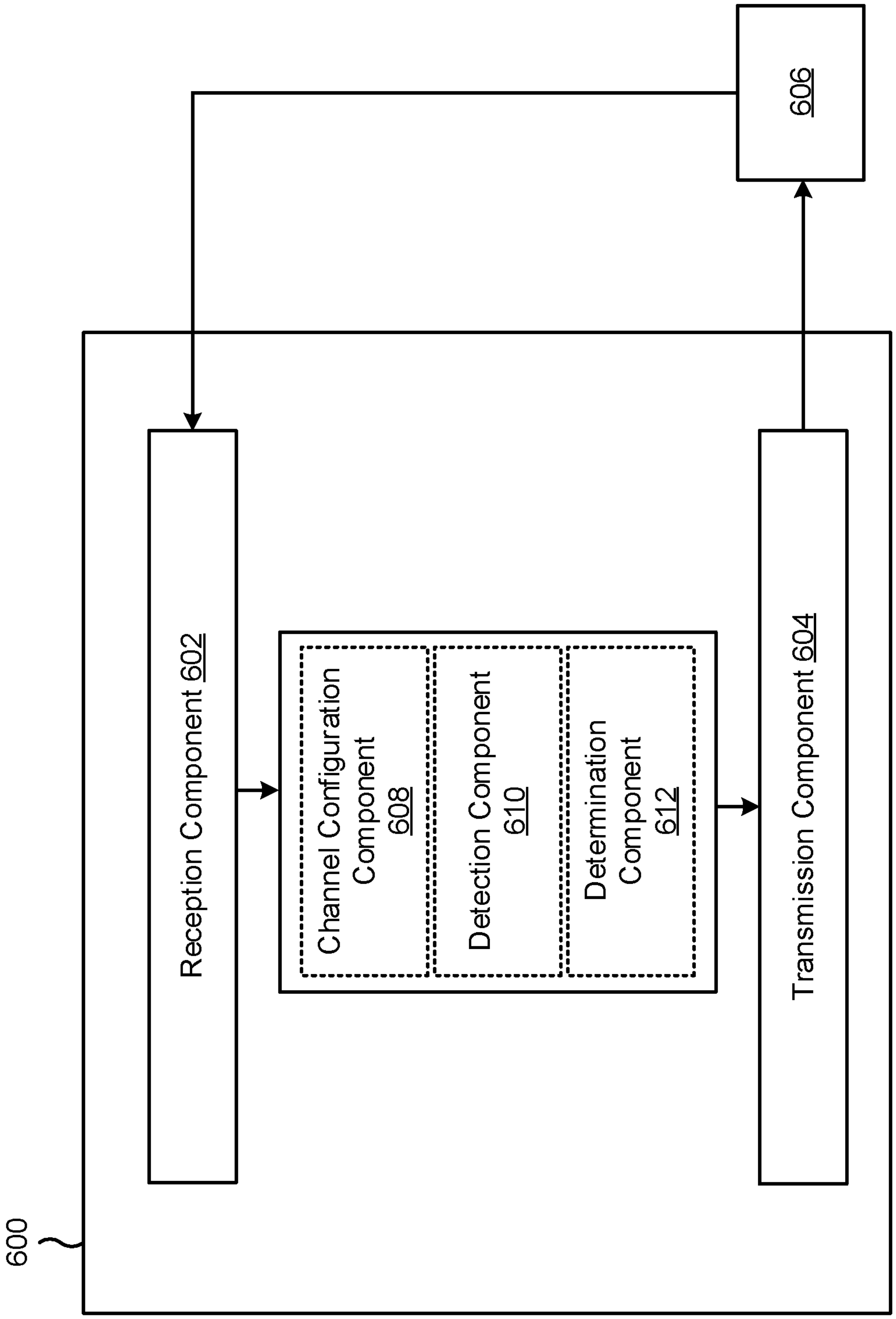
FIG. 6 is a block diagram of an example apparatus for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of a channel configuration component 608, a detection component 610, and/or a determination component 612, among other examples.

In some aspects, the apparatus 600 may be configured to perform one or more operations described herein in connection with FIG. 4. Additionally, or alternatively, the apparatus 600 may be configured to perform one or more processes described herein, such as process 500 of FIG. 5, or a combination thereof. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The channel configuration component 608 may configure a first channel associated with a first SIM, the first SIM associated with data traffic. The channel configuration component 608 may configure a second channel associated with a second SIM in a DSDA mode. The detection component 610 may detect, on the second channel, a subscription related data stream that includes voice call traffic. The determination component 612 may determine, based at least in part on detecting the subscription related data stream, to switch the data traffic from the first SIM to the second SIM based at least in part on a UE operation mode. The channel configuration component 608 may switch the data traffic from the first SIM to the second SIM based at least in part on the determination to switch the data traffic from the first SIM to the second SIM.

The channel configuration component 608 may perform a temporary DDS switch from the first SIM to the second SIM.

The channel configuration component 608 may switch the data traffic from the first SIM to the second SIM for a duration of the subscription related data stream.

The detection component 610 may detect that at least one of the first SIM or the second SIM has transitioned to a radio access technology or a frequency band that does not support the DSDA mode.

The detection component 610 may detect a condition that prevents the UE from operating in the DSDA mode. The determination component 612 may determine to switch the data traffic from the first SIM to the second SIM based at least in part on the detection of the condition that prevents the UE from operating in the DSDA mode.

The determination component 612 may compare the first channel condition and the second channel condition. The determination component 612 may determine to switch the data traffic from the first SIM to the second SIM based at least in part on the comparison of the first channel condition and the second channel condition.

The determination component 612 may determine that at least one of: a first throughput of the second channel is greater than a second throughput of the first channel by a throughput threshold, a first delay of the second channel is less than a second delay of the first channel by a delay threshold, or a first RF condition of the second channel is greater than a second RF condition of the first channel by an RF threshold.

The determination component 612 may identify an application associated with the data traffic. The determination component 612 may determine that the application is associated with the second SIM. The determination component 612 may determine to switch the data traffic from the first SIM to the second SIM based at least in part on the determination that the application is associated with the second SIM.

The determination component 612 may determine to switch the data traffic from the first SIM to the second SIM based at least in part on a capability of at least one of the UE, a first network associated with the first SIM, or a second network associated with the second SIM.

The determination component 612 may identify a configuration that indicates that the UE is enabled to switch data traffic from the first SIM to the second SIM.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by a user equipment (UE), comprising: configuring a first channel associated with a first subscriber identity module (SIM), the first SIM associated with data traffic; configuring a second channel associated with a second SIM in a dual SIM dual active (DSDA) mode; detecting, on the second channel, a subscription related data stream, wherein the subscription related data stream includes voice call traffic; determining, based at least in part on detecting the subscription related data stream, to switch the data traffic from the first SIM to the second SIM based at least in part on a UE operation mode; and switching the data traffic from the first SIM to the second SIM based at least in part on the determination to switch the data traffic from the first SIM to the second SIM.

Aspect 2: The method of Aspect 1, wherein switching the data traffic from the first SIM to the second SIM comprises: performing a temporary default data subscription (DDS) switch from the first SIM to the second SIM.

Aspect 3: The method of any of Aspects 1-2, wherein switching the data traffic from the first SIM to the second SIM comprises: switching the data traffic from the first SIM to the second SIM for a duration of the subscription related data stream.

Aspect 4: The method of any of Aspects 1-3, wherein determining to switch the data traffic from the first SIM to the second SIM comprises: detecting that the UE operation mode indicates that the DSDA mode is not supported based at least in part on at least one of the first SIM or the second SIM transitioning to a radio access technology or a frequency band that does not support the DSDA mode.

Aspect 5: The method of any of Aspects 1-4, wherein determining to switch the data traffic from the first SIM to the second SIM comprises: detecting that the UE operation mode indicates that the DSDA mode is not supported based at least in part on detecting a condition that prevents the UE from operating in the DSDA mode; and determining to switch the data traffic from the first SIM to the second SIM based at least in part on the detection of the condition that prevents the UE from operating in the DSDA mode.

Aspect 6: The method of any of Aspects 1-5, wherein determining to switch the data traffic from the first SIM to the second SIM comprises: comparing the first channel condition and the second channel condition; and determining to switch the data traffic from the first SIM to the second SIM based at least in part on the comparison of the first channel condition and the second channel condition.

Aspect 7: The method of any of Aspects 1-6, wherein determining to switch the data traffic from the first SIM to the second SIM comprises: determining that at least one of:

a first throughput of the second channel is greater than a second throughput of the first channel by a throughput threshold, a first delay of the second channel is less than a second delay of the first channel by a delay threshold, or a first radio frequency (RF) condition of the second channel is greater than a second RF condition of the first channel by an RF threshold.

Aspect 8: The method of any of Aspects 1-7, wherein determining to switch the data traffic from the first SIM to the second SIM comprises: identifying an application associated with the data traffic; determining that the application is associated with the second SIM; and determining to switch the data traffic from the first SIM to the second SIM based at least in part on the determination that the application is associated with the second SIM.

Aspect 9: The method of any of Aspects 1-8, wherein determining to switch the data traffic from the first SIM to the second SIM comprises: determining to switch the data traffic from the first SIM to the second SIM based at least in part on a capability of at least one of the UE, a first network associated with the first SIM, or a second network associated with the second SIM.

Aspect 10: The method of any of Aspects 1-9, wherein determining to switch the data traffic from the first SIM to the second SIM is based at least in part on at least one of: a channel throughput condition, a channel delay condition, a channel latency condition, or a radio frequency (RF) condition.

Aspect 11: The method of Aspect 10, wherein the RF condition includes at least one of: a reference signal received power (RSRP) condition, a reference signal received quality (RSRQ) condition, a received signal strength indicator (RSSI) condition, a signal-to-noise ratio (SNR) condition, a signal-to-interference-plus-noise ratio (SINR) condition, or a cell selection criteria condition.

Aspect 12: The method of any of Aspects 1-11, further comprising: identifying a configuration that indicates that the UE is enabled to switch data traffic from the first SIM to the second SIM.

Aspect 13: The method of any of Aspects 1-12, wherein the subscription related data stream includes at least one of: voice call traffic, or video call traffic.

Aspect 14: The method of any of Aspects 1-13, wherein the data traffic includes internet traffic.

Aspect 15: The method of any of Aspects 1-14, wherein the UE operation mode indicates at least one of: whether the DSDA mode can be supported by the UE; or a transmit chain sharing state of the UE.

Aspect 16: An apparatus for wireless communication at a device, comprising a processor; memory coupled with the processor; and instructions stored in the memory and executable by the processor to cause the apparatus to perform the method of one or more Aspects of Aspects 1-15.

Aspect 17: A device for wireless communication, comprising a memory and one or more processors coupled to the memory, the memory and the one or more processors configured to perform the method of one or more Aspects of Aspects 1-15.

Aspect 18: An apparatus for wireless communication, comprising at least one means for performing the method of one or more Aspects of Aspects 1-15.

Aspect 19: A non-transitory computer-readable medium storing code for wireless communication, the code comprising instructions executable by a processor to perform the method of one or more Aspects of Aspects 1-15.

Aspect 20: A non-transitory computer-readable medium storing a set of instructions for wireless communication, the set of instructions comprising one or more instructions that, when executed by one or more processors of a device, cause the device to perform the method of one or more Aspects of Aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

configuring a first channel, associated with a first subscriber identity module (SIM), between the UE and a first network entity, wherein the first SIM is a default data subscription (DDS) SIM associated with data traffic, and wherein the first SIM is using New Radio (NR) radio access technology (RAT);

configuring a second channel, associated with a second SIM in a dual SIM dual active (DSDA) mode, between the UE and a second network entity, wherein the second SIM is a non-DDS SIM, and wherein the second SIM is using the NR RAT;

communicating the data traffic using the first channel;

detecting, on the second channel, a subscription related data stream that includes voice call traffic while operating in the DSDA mode;

detecting that the UE has transitioned from a first RAT combination that supports the DSDA mode to a second RAT combination that does not support the DSDA mode, wherein, in the first RAT combination, both the first SIM and the second SIM are using the NR RAT, and wherein, in the second RAT combination, one of the first SIM or the second SIM is using the NR RAT and another of the first SIM or the second SIM is using a Long Term Evolution (LTE) RAT;

transitioning from the DSDA mode to a dual SIM dual standby (DSDS) mode based at least in part on detecting that the UE has transitioned from the first RAT combination to the second RAT combination;

determining, based at least in part on detecting the subscription related data stream that includes the voice call traffic and based at least part on the UE having transitioned from the DSDA mode to the DSDS mode, to switch the data traffic from the first channel to the second channel; and switching the data traffic from the first channel to the second channel based at least in part on the determination to switch the data traffic from the first channel to the second channel.

2. The method of claim 1, wherein switching the data traffic from the first channel to the second channel comprises:

performing a temporary DDS switch from the first SIM to the second SIM.

3. The method of claim 1, wherein switching the data traffic from the first channel to the second channel comprises:

switching the data traffic from the first channel to the second channel for a duration of the subscription related data stream.

4. The method of claim 1, wherein determining to switch the data traffic from the first channel to the second channel comprises:

determining that at least one of:

a first throughput of the second channel is greater than a second throughput of the first channel by a throughput threshold, a first delay of the second channel is less than a second delay of the first channel by a delay threshold, or a first radio frequency (RF) condition of the second channel is greater than a second RF condition of the first channel by an RF threshold.

5. The method of claim 1, wherein determining to switch the data traffic from the first channel to the second channel comprises:

identifying an application associated with the data traffic;

determining that the application is associated with the second SIM; and determining to switch the data traffic from the first channel to the second channel based at least in part on the determination that the application is associated with the second SIM.

6. The method of claim 1, wherein determining to switch the data traffic from the first channel to the second channel comprises:

determining to switch the data traffic from the first channel to the second channel based at least in part on a capability of at least one of the UE, a first network associated with the first SIM, or a second network associated with the second SIM.

7. The method of claim 1, wherein determining to switch the data traffic from the first channel to the second channel is based at least in part on at least one of:

a channel throughput condition, a channel delay condition, a channel latency condition, or a radio frequency (RF) condition.

8. The method of claim 7, wherein the RF condition includes at least one of:

a reference signal received power (RSRP) condition, a reference signal received quality (RSRQ) condition, a received signal strength indicator (RSSI) condition, a signal-to-noise ratio (SNR) condition, a signal-to-interference-plus-noise ratio (SINR) condition, or a cell selection criteria condition.

9. The method of claim 1, further comprising:

identifying a configuration that indicates that the UE is enabled to switch data traffic from the first channel to the second channel.

10. The method of claim 1, wherein determining to switch the data traffic from the first channel to the second channel comprises:

determining to switch the data traffic from the first channel to the second channel based at least in part on a transmit chain sharing state of the UE.

11. The method of claim 1, further comprising:

communicating, using the second SIM based at least in part on switching the data traffic from the first channel to the second channel, the data traffic and the subscription related data stream that includes the voice call traffic.

12. A user equipment (UE) for wireless communication, comprising:

one or more antennas; and a processing system that includes one or more processors and one or more memories that store code and are coupled with the one or more processors, the processing system configured to cause the UE to:

configure a first channel, associated with a first subscriber identity module (SIM), between the UE and a first network entity, wherein the first SIM is a default data subscription (DDS) SIM associated with data traffic, and wherein the first SIM is using New Radio (NR) radio access technology (RAT);

configure a second channel, associated with a second SIM in a dual SIM dual active (DSDA) mode, between the UE and a second network entity, wherein the second SIM is a non-DDS SIM, and wherein the second SIM is using the NR RAT;

communicate the data traffic using the first channel;

detect, on the second channel, a subscription related data stream that includes voice call traffic while the UE is in the DSDA mode;

detect that the UE has transitioned from a first RAT combination that supports the DSDA mode to a second RAT combination that does not support the DSDA mode, wherein, in the first RAT combination, both the first SIM and the second SIM are using the NR RAT, and wherein, in the second RAT combination, one of the first SIM or the second SIM is using the NR RAT and another of the first SIM or the second SIM is using a Long Term Evolution (LTE) RAT;

transition from the DSDA mode to a dual SIM dual standby (DSDS) mode based at least in part on the UE having transitioned from the RAT combination to the second RAT combination;

determine, based at least in part on the detection of the subscription related data stream that includes the voice call traffic and based at least part on the UE having transitioned from the DSDA mode to the DSDS mode, to switch the data traffic from the first channel to the second channel; and switch the data traffic from the first channel to the second channel based at least in part on the determination to switch the data traffic from the first channel to the second channel.

13. The UE of claim 12, wherein the processing system, to switch the data traffic from the first channel to the second channel, is configured to cause the UE to:

perform a temporary DDS switch from the first SIM to the second SIM.

14. The UE of claim 12, wherein the processing system, to switch the data traffic from the first channel to the second channel, is configured to cause the UE to:

switch the data traffic from the first channel to the second channel for a duration of the subscription related data stream.

15. The UE of claim 12, wherein the processing system is further configured to cause the UE to:

detect that a UE operation mode indicates that the DSDA mode is not supported based at least in part on at least one of the first SIM or the second SIM transitioning to a RAT or a frequency band that does not support the DSDA mode.

16. The UE of claim 12, wherein the processing system, to determine to switch the data traffic from the first channel to the second channel, is configured to cause the UE to:

detect that a UE operation mode indicates that the DSDA mode is not supported based at least in part on a condition, that prevents the UE from operating in the DSDA mode, being detected; and determine to switch the data traffic from the first channel to the second channel based at least in part on the detection of the condition that prevents the UE from operating in the DSDA mode.

17. The UE of claim 12, wherein the processing system, to determine to switch the data traffic from the first channel to the second channel, is configured to cause the UE to:

determine that at least one of:

a first throughput of the second channel is greater than a second throughput of the first channel by a throughput threshold, a first delay of the second channel is less than a second delay of the first channel by a delay threshold, or a first radio frequency (RF) condition of the second channel is greater than a second RF condition of the first channel by an RF threshold.

18. The UE of claim 12, wherein the processing system, to determine to switch the data traffic from the first channel to the second channel, is configured to cause the UE to:

identify an application associated with the data traffic;

determine that the application is associated with the second SIM; and determine to switch the data traffic from the first channel to the second channel based at least in part on the determination that the application is associated with the second SIM.

19. The UE of claim 12, wherein the processing system, to determine to switch the data traffic from the first channel to the second channel, is configured to cause the UE to:

determine to switch the data traffic from the first channel to the second channel based at least in part on a capability of at least one of the UE, a first network associated with the first SIM, or a second network associated with the second SIM.

20. The UE of claim 12, wherein the processing system, to determine to switch the data traffic from the first channel to the second channel, is configured to cause the UE to:

determine to switch the data traffic from the first channel to the second channel based at least in part on at least one of:

a channel throughput condition, a channel delay condition, a channel latency condition, or a radio frequency (RF) condition.

21. The UE of claim 20, wherein the RF condition includes at least one of:

a reference signal received power (RSRP) condition, a reference signal received quality (RSRQ) condition, a received signal strength indicator (RSSI) condition, a signal-to-noise ratio (SNR) condition, a signal-to-interference-plus-noise ratio (SINR) condition, or a cell selection criteria condition.

22. The UE of claim 12, wherein the processing system is further configured to cause the UE to:

identify a configuration that indicates that the UE is enabled to switch data traffic from the first channel to the second channel.

23. The UE of claim 12, wherein the processing system, to determine to switch the data traffic from the first channel to the second channel, is configured to cause the UE to:

determine to switch the data traffic from the first channel to the second channel based at least in part on a transmit chain sharing state of the UE.

24. A non-transitory computer-readable medium storing a set of instructions for wireless communication, the set of instructions comprising:

one or more instructions that, when executed by one or more processors of a user equipment (UE), cause the UE to:

configure a first channel, associated with a first subscriber identity module (SIM), between the UE and a first network entity, wherein the first SIM is a default data subscription (DDS) SIM associated with data traffic, and wherein the first SIM is using New Radio (NR) radio access technology (RAT);

configure a second channel, associated with a second SIM in a dual SIM dual active (DSDA) mode, between the UE and a second network entity, wherein the second SIM is a non-DDS SIM, and wherein the second SIM is using the NR RAT;

communicate the data traffic using the first channel;

detect, on the second channel, a subscription related data stream that includes voice call traffic while the UE is in the DSDA mode;

detect that the UE has transitioned from a first RAT combination that supports the DSDA mode to a second RAT combination that does not support the DSDA mode, wherein, in the first RAT combination, both the first SIM and the second SIM are using the NR RAT, and wherein, in the second RAT combination, one of the first SIM or the second SIM is using the NR RAT and another of the first SIM or the second SIM is using a Long Term Evolution (LTE) RAT;

transition from the DSDA mode to a dual SIM dual standby (DSDS) mode based at least in part on the UE having transitioned from the first RAT combination to the second RAT combination;

determine, based at least in part on the detection of the subscription related data stream that includes the voice call traffic and based at least part on the UE having transitioned from the DSDA mode to the DSDS mode, to switch the data traffic from the first channel to the second channel; and switch the data traffic from the first channel to the second channel based at least in part on the determination to switch the data traffic from the first channel to the second channel.

25. The non-transitory computer-readable medium of claim 24, wherein the one or more instructions, to cause the UE to determine to switch the data traffic from the first channel to the second channel, cause the UE to:

determine to switch the data traffic from the first channel to the second channel based at least in part on a transmit chain sharing state of the UE.

26. The non-transitory computer-readable medium of claim 24, wherein the one or more instructions, to cause the UE to switch the data traffic from the first channel to the second channel, cause the UE to:

perform a temporary DDS switch from the first SIM to the second SIM; and switch the data traffic from the first channel to the second channel for a duration of the subscription related data stream.

27. An apparatus for wireless communication, comprising:

means for configuring a first channel, associated with a first subscriber identity module (SIM), between a user equipment (UE) and a first network entity, wherein the first SIM is a default data subscription (DDS) SIM associated with data traffic, and wherein the first SIM is using New Radio (NR) radio access technology (RAT);

means for configuring a second channel, associated with a second SIM in a dual SIM dual active (DSDA) mode, between the UE and a second network entity, wherein the second SIM is a non-DDS SIM, and wherein the second SIM is using the NR RAT;

means for communicating the data traffic using the first channel;

means for detecting, on the second channel, a subscription related data stream that includes voice call traffic while the UE is in the DSDA mode;

means for detecting that the UE has transitioned from a first RAT combination that supports the DSDA mode to a second RAT combination that does not support the DSDA mode, wherein, in the first RAT combination, both the first SIM and the second SIM are using the NR RAT, and wherein, in the second RAT combination, one of the first SIM or the second SIM is using the NR RAT and another of the first SIM or the second SIM is using a Long Term Evolution (LTE) RAT;

means for transitioning from the DSDA mode to a dual SIM dual standby (DSDS) mode based at least in part on detecting that the UE has transitioned from the first RAT combination to the second RAT combination;

means for determining, based at least in part on detecting the subscription related data stream that includes the voice call traffic and based at least part on the UE having transitioned from the DSDA mode to the DSDS mode, to switch the data traffic from the first channel to the second channel; and means for switching the data traffic from the first channel to the second channel based at least in part on the determination to switch the data traffic from the first channel to the second channel.

28. The apparatus of claim 27, wherein the means for determining to switch the data traffic from the first channel to the second channel comprises:

means for performing a temporary DDS switch from the first SIM to the second SIM.

29. The apparatus of claim 27, wherein the means for switching the data traffic from the first channel to the second channel comprises:

means for switching the data traffic from the first channel to the second channel for a duration of the subscription related data stream.

30. The apparatus of claim 27, wherein the means for determining to switch the data traffic from the first channel to the second channel comprises:

means for determining that at least one of:

a first throughput of the second channel is greater than a second throughput of the first channel by a throughput threshold, a first delay of the second channel is less than a second delay of the first channel by a delay threshold, or a first radio frequency (RF) condition of the second channel is greater than a second RF condition of the first channel by an RF threshold.

* * * * *